United States Patent
Luo

(10) Patent No.: US 11,733,388 B2
(45) Date of Patent: Aug. 22, 2023

(54) METHOD, APPARATUS AND ELECTRONIC DEVICE FOR REAL-TIME OBJECT DETECTION

(71) Applicant: Beijing Qingzhouzhihang Intelligent Technology Co., Ltd, Beijing (CN)

(72) Inventor: Wenjie Luo, Beijing (CN)

(73) Assignee: Beijing Qingzhouzhihang Intelligent Technology Co., Ltd, Beijing (CN)

( * ) Notice: Subject to any disclaimer, the term of this patent is extended or adjusted under 35 U.S.C. 154(b) by 312 days.

(21) Appl. No.: 17/034,245

(22) Filed: Sep. 28, 2020

(65) Prior Publication Data
US 2021/0302584 A1    Sep. 30, 2021

(30) Foreign Application Priority Data
Mar. 30, 2020   (CN) .......................... 202010240407.7

(51) Int. Cl.
*G01S 17/89*   (2020.01)
*G06T 7/73*    (2017.01)

(52) U.S. Cl.
CPC .............. *G01S 17/89* (2013.01); *G06T 7/73* (2017.01); *G06T 2207/10028* (2013.01); *G06T 2207/20084* (2013.01)

(58) Field of Classification Search
None
See application file for complete search history.

(56) References Cited

U.S. PATENT DOCUMENTS

| 2010/0066740 A1* | 3/2010 | Wang | G06T 17/05 345/420 |
| 2018/0108139 A1* | 4/2018 | Abramoff | G06N 3/0454 |

(Continued)

FOREIGN PATENT DOCUMENTS

| CN | 104380133 A * | 2/2015 | G01S 17/42 |

*Primary Examiner* — Arleen M Vazquez
*Assistant Examiner* — Brandon J Becker
(74) *Attorney, Agent, or Firm* — Harness, Dickey & Pierce, P.L.C.

(57) ABSTRACT

A method, an apparatus and an electronic device for real-time object detection are provided according to the present disclosure. In the method, target point cloud data in a range of a preset angle is acquired, where the target point cloud data includes one or more data points, and the preset angle is less than the round angle. A one-dimensional LiDAR point feature of each of the data points in the target point cloud data is determined. A previous frame of LiDAR feature vector is updated based on the one-dimensional LiDAR point feature of each of the data points in the target point cloud data to generate a current frame of LiDAR feature vector. Object information is determined in a real-time manner based on the current frame of LiDAR feature vector. With the method, apparatus and electronic device for real-time object detection provided according to embodiments of the present disclosure, a part of the point cloud data is selected to be processed in real time, which can reduce data delay, reduce the overall running time, and improve processing efficiency. By updating the whole LiDAR feature vector, the object information can be determined in real time in the whole range, so as to realize the object detection in the whole range.

8 Claims, 3 Drawing Sheets

(56) References Cited

U.S. PATENT DOCUMENTS

2019/0065910 A1* 2/2019 Wang .................. G06T 7/73
2019/0120939 A1* 4/2019 O'Keeffe .............. G01S 7/4817
2021/0096109 A1* 4/2021 Sinha ................. G01F 1/662

* cited by examiner

METHOD, APPARATUS AND ELECTRONIC DEVICE FOR REAL-TIME OBJECT DETECTION

RELATED APPLICATION

This application claims priority to Chinese Patent Application No. 202010240407.7, entitled "METHOD, APPARATUS AND ELECTRONIC DEVICE FOR REAL-TIME OBJECT DETECTION," filed Mar. 30, 2020, which is incorporated herein by reference for all purposes.

FIELD

The present disclosure relates to the technical field of object detection, and in particular, to a method, an apparatus, an electronic device, and a computer-readable storage medium for real-time object detection.

BACKGROUND

The development of unmanned vehicles has a very promising future. It can reduce the probability of accidents, so as to improve traffic reliability. It can reduce urban congestion, so as to improve travel efficiency. Also it can promote new applications in sharing economy, so as to save social resources. One of the most important technologies of the unmanned vehicle system is real-time object detection. A self-driving car can well understand the scene and make an optimal decision only if it can detect surrounding objects.

This requires accuracy and real-time performance. Regarding accuracy, it is required not only that the system can detect any objects appearing in the scene so as to have a high recall rate, but also that the system can correctly detect the objects so as to have a high precision. Regarding the real-time performance, it is required that the detection system can detect the object in the time as short as possible. The time includes the time for collecting and transmitting data by a sensor, and the time for processing the data by an algorithm.

At present, the detection mainly relies on LiDAR (Light Detection and Ranging, LiDAR) data. Representative algorithms include pixor, voxelNet, PointPillars, STD and the like, which all use the CNN (Convolutional Neural Networks) to learn features of a point cloud and then perform object detection. Specifically, the input of the algorithms is point cloud data collected by a LiDAR device rotating around. First, features of each point on an x-y plane are extracted through a pixor process or a fully-linked network (voxelnet, PointPillars, etc.), and then CNN is used to process these features and output information such as whether there is an object at each point on the x-y plane, and the size and angle of the object. Different algorithms focus on optimization of the feature extraction method and the design of CNN, to improve accuracy and reduce algorithm running time.

In a practical unmanned vehicle, the running time of the entire detection system includes the time of collecting point cloud data and the algorithm running time. The running time of existing algorithms can already reach 30 ms. However, it takes about 100 ms to collect a round of point cloud data by a LiDAR device, which results in a large data delay, i.e., a low real-time performance.

SUMMARY

In order to solve the existing technical problem, a method, an apparatus, an electronic device, and computer-readable storage medium for real-time object detection are provided according to embodiments of the present disclosure.

In a first aspect, a method for real-time object detection is provided according to an embodiment of the present disclosure, including:

acquiring target point cloud data in a range of a preset angle, where the target point cloud data includes one or more data points, and the preset angle is less than the round angle;

determining a one-dimensional Light Detection and Ranging (LiDAR) point feature of each of the data points in the target point cloud data;

updating a previous frame of LiDAR feature vector based on the one-dimensional LiDAR point feature of each of the data points in the target point cloud data to generate a current frame of LiDAR feature vector; and determining object information in a real-time manner based on the current frame of LiDAR feature vector.

In a second aspect, an apparatus for real-time object detection is provided according to an embodiment of the present disclosure, including:

a data acquiring module, configured to acquire target point cloud data in a range of a preset angle, where the target point cloud data includes one or more data points, and the preset angle is less than the round angle;

a processing module, configured to determine a one-dimensional LiDAR point feature of each of the data points in the target point cloud data, and update a previous frame of LiDAR feature vector based on the one-dimensional LiDAR point feature of each of the data points in the target point cloud data to generate a current frame of LiDAR feature vector; and a real-time determining module, configured to determine object information in a real-time manner based on the current frame of LiDAR feature vector.

In a third aspect, an electronic device is provided according to an embodiment of the present disclosure, including a bus, a transceiver, a memory, a processor, and a computer program stored in the memory and executable by the processor. The transceiver, the memory and the processor are connected to each other via the bus. The computer program is used to, when being executed by the processor, perform steps in any method for real-time object detection described above.

In a fourth aspect, a computer-readable storage medium is provided according to an embodiment of the present disclosure. The computer-readable storage medium stores a computer program which is used to, when being executed by a processor, perform steps in any method for real-time object detection described above.

In the method, apparatus, electronic device and computer-readable storage medium for real-time object detection provided according to the embodiments of the present disclosure, point cloud data collected in a range of an angle less than the round angle is used as target point cloud data, so as to segment point cloud data in the time dimension, thereby leading to a small time period of extraction of one-dimensional features of the point cloud data. Also, the one-dimensional features of the partial target point cloud data are used to update the complete LiDAR feature vector, so that a new LiDAR feature vector is generated in real time to determine information of a surrounding object, thereby realizing object detection. In this method, a part of the point cloud data is selected to be processed in real time, so as to avoid the problem of low overall processing efficiency due to the large delay of LiDAR data collection. Therefore, this method can reduce data delay, reduce the overall running time, and improve processing efficiency. By updating the whole LiDAR feature vector, the object information can be determined in real time in the whole range, so as to realize the object detection in the whole range.

BRIEF DESCRIPTION OF THE DRAWINGS

In order to describe the technical solutions in the embodiments of the present disclosure or the conventional technology more clearly, the drawings used in the description of the embodiments of the present disclosure or the conventional technology are briefly described hereafter.

DETAILED DESCRIPTION

Figure 1:
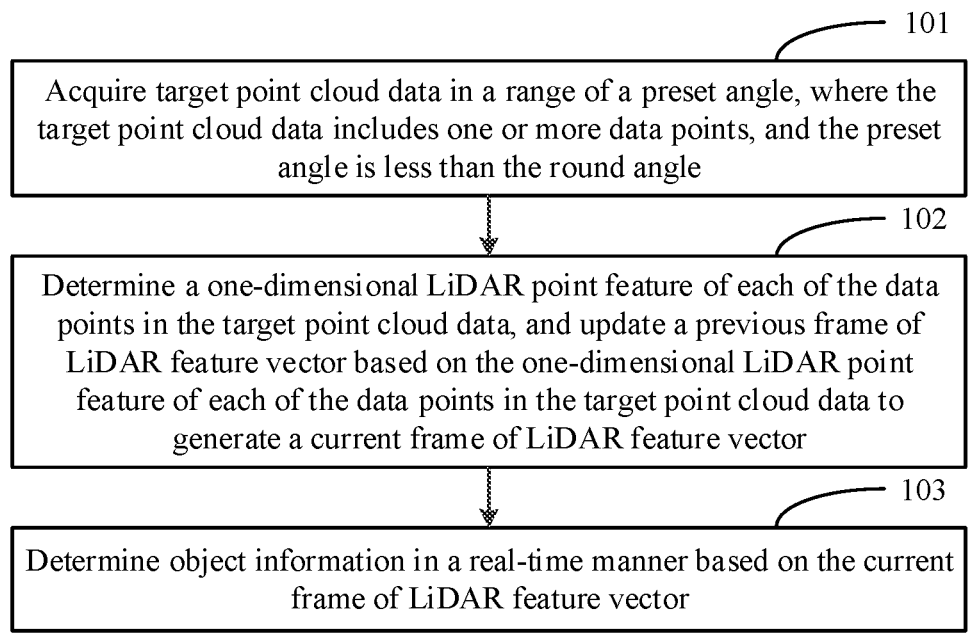
FIG. 1 is a flowchart of a method for real-time object detection according to an embodiment of the present disclosure.

In the description of the embodiments of the present disclosure, those skilled in the art should understand that the embodiments of the present disclosure may be implemented as a method, an apparatus, an electronic device, and a computer-readable storage medium. Therefore, the embodiments of the present disclosure may be embodied in the following forms: complete hardware, complete software (including firmware, resident software, microcode, etc.), a combination of hardware and software. In addition, in some embodiments, the embodiments of the present disclosure may also be implemented in the form of a computer program product in one or more computer-readable storage mediums, where the computer-readable storage mediums include computer program codes.

The computer-readable storage medium may be any combination of one or more computer-readable storage mediums. The computer-readable storage medium includes: an electronic, magnetic, optical, electromagnetic, infrared, or semiconductor system, apparatus, or device, or any combination thereof. More specific examples of computer-readable storage medium include: portable computer disk, hard disk, Random Access Memory (RAM), Read-Only Memory (ROM), Erasable Programmable Read-Only Memory (EPROM), flash memory, optical fiber, Compact Disc-Read Only Memory (CD-ROM), optical storage device, magnetic storage device or any combination of the above. In the embodiment of the present disclosure, the computer-readable storage medium may be any tangible medium containing or storing a program, and the program may be used by or in combination with an instruction execution system, apparatus, or device.

The computer program code contained in the computer-readable storage medium may be transmitted using any appropriate medium, including: wireless, wire, optical cable, Radio Frequency (RF) or any suitable combination thereof.

The computer program code for performing the operations of the embodiments of the present disclosure may be written in assembly instructions, Instruction Set Architecture (ISA) instructions, machine instructions, machine-related instructions, microcode, firmware instructions, state setting data, integrated circuit configuration data, or in one or more programming languages or combinations thereof. The programming languages includes an object-oriented programming language, such as Java, Smalltalk, C++, and a conventional procedural programming language, such as C language or similar programming language. The computer program code may be executed entirely on the user's computer, partly on the user's computer, as an independent software package, partly on the user's computer and partly on a remote computer, and entirely on the remote computer or server. In the case involving a remote computer, the remote computer may be connected to a user computer or an external computer through any kind of network, including a local area network (LAN) or a wide area network (WAN).

In the embodiments of the present disclosure, the provided method, apparatus, and electronic device are described by using flowcharts and/or block diagrams.

It should be understood that each block of the flowcharts and/or block diagrams, and combinations of blocks in the flowcharts and/or block diagrams, may be implemented by computer-readable program instructions. These computer-readable program instructions may be provided to a processor of a general-purpose computer, a special-purpose computer, or another programmable data processing device, thereby producing a machine. These computer-readable program instructions are executed by a computer or another programmable data processing device to produce an apparatus for implementing the functions/operations specified by the blocks in the flowcharts and/or block diagrams.

These computer-readable program instructions may also be stored in a computer-readable storage medium that enables a computer or another programmable data processing device to work in a specific manner. In this way, the instructions stored in the computer-readable storage medium produce an instruction device product that implements the functions/operations specified in the blocks of the flowcharts and/or block diagrams.

Computer-readable program instructions may also be loaded onto a computer, another programmable data processing device, or another device, such that a series of operating steps can be performed on a computer, another programmable data processing device, or another device to produce a computer-implemented process. Thus, the instructions executed on a computer or another programmable data processing device can provide a process for implementing the functions/operations specified by the blocks in the flowcharts and/or block diagrams.

Embodiments of the present disclosure are described below with reference to the drawings of the embodiments.

FIG. 1 is a flowchart of a method for real-time object detection according to an embodiment of the present disclosure. As shown in FIG. 1, the method includes steps 101 to 103.

In step 101, target point cloud data in a range of a preset angle are acquired. The target point cloud data includes one or more data points. The preset angle is less than the round angle.

In the embodiment of the present disclosure, the point cloud data may specifically be a set of vectors, each vector corresponding to a data point. For example, the point cloud data may be a set of three-dimensional vectors in a three-dimensional coordinate system, where the three-dimensional vectors may generally be represented by three-dimensional coordinates of X, Y, Z. The point cloud data may also include other information such as depth. In this embodiment, the point cloud data may be obtained by LiDAR scanning. A round of LiDAR scanning can obtain a round of point cloud data. In this embodiment, an angle smaller than the round angle (i.e., 360°) is used as the preset angle, and the point cloud data in the range of the preset angle is used as the target point cloud data. Specifically, the point cloud data collected by the LiDAR device rotating by the preset angle may be used as the target point cloud data. The target point cloud data includes one or more data points, generally including multiple data points.

Optionally, the preset angle may be determined based on an algorithm processing time. In this embodiment, the above step of obtaining target point cloud data within a preset angle includes the following steps A1 and A2.

In step A1, a time length $T_1$ required for acquiring a round of point cloud data by a LiDAR device is acquired, and a time length $T_2$ required for processing the round of point cloud data is acquired, and then the preset angle α is determined as $$\alpha = k \frac{T_2}{T_1} \times R,$$

where k denotes an adjusting coefficient, and R denotes the round angle.

In step A2, the target point cloud data is generated based on the one or more data points collected by the LiDAR device in the range of the preset angle.

In the embodiment of the present disclosure, after the point cloud data is determined, the time length for processing the point cloud data by an algorithm is basically determinable, that is, the data processing time length $T_2$ is basically determinable. The data processing time length $T_2$ is shorter than the time length $T_1$ for collecting a round of point cloud data by the LiDAR device. In this embodiment, the preset angle is determined based on the two time lengths, so that the process of collecting the point cloud data by the LiDAR device can be matched with the process of processing the point cloud data by the algorithm, avoiding a low efficiency due to a long time of waiting for one of the processes. Specifically, the preset angle is determined as $$\alpha = k \frac{T_2}{T_1} \times R,$$

where k denotes an adjusting coefficient, and generally has a value equal to or greater than 1. When k=1, it defines the lower limit of the preset angle. R denotes the round angle, i.e., 360° or a radian of 2π. For example, LiDAR collects a round of point cloud data every 100 ms, that is, $T_1$=100 ms, and the time for processing the point cloud data by an algorithm is 25 ms, that is, $T_2$=25 ms. If the value of k is 1, the preset angle is α=90°. That is, the point cloud data collected by every 90° of rotation of the LiDAR device is used as the target point cloud data, so that the overall processing delay is 25 ms. However, the traditional solution of processing a round of point cloud data requires a delay of 100 ms. Compared with the traditional solution, the present embodiment can greatly reduce the delay and thus improve the processing efficiency.

In step 102, a one-dimensional LiDAR point feature of each of the data points in the target point cloud data is determined, and a previous frame of LiDAR feature vector is updated based on the one-dimensional LiDAR point feature of each of the data points in the target point cloud data, to generate a current frame of LiDAR feature vector.

In the embodiment of the present disclosure, feature extraction is performed on each data point in the target point cloud data to determine a one-dimensional feature of the data point, i.e., the one-dimensional LiDAR point feature. Multiple one-dimensional LiDAR feature points form a multi-dimensional feature vector. Since the target point cloud data is a part of a round of data, the target point cloud data can represents only a part of the surrounding objects. In this embodiment, a complete feature vector is generated by combining the current target point cloud data and the previous data.

Specifically, in the embodiment of the present disclosure, a previous frame of LiDAR feature vector is updated based on all the one-dimensional LiDAR point features of the target point cloud data obtained in the current frame, so that in the previous frame of LiDAR feature vector, the feature corresponding to the one-dimensional LiDAR point feature of the current frame can be updated, thereby realizing the real-time update of the previous frame of LiDAR feature vector. The updated previous frame of LiDAR feature vector is used as the current frame of LiDAR feature vector.

It should be noted that the term "frame" in this embodiment is not limited to an image in a video stream. In this embodiment, a result of each round of processing is referred to as a "frame". For example, every 25 ms the collected point cloud data are used as the target point cloud data for a round of data processing, that is, every 25 ms a "frame" is generated. Accordingly, every 25 ms a current LiDAR feature vector is generated, i.e., the current frame of LiDAR feature vector.

In step 103, object information is determined in a real-time manner based on the current frame of LiDAR feature vector.

In the embodiment of the present disclosure, the current frame of LiDAR feature vector can completely represent the position and other information of surrounding objects. By decoding and analyzing the current frame of LiDAR feature vector, information of the surrounding objects can be extracted in real time to determine the location, properties and other information of the surrounding objects.

In the method for real-time object detection provided according to the embodiment of the present disclosure, point cloud data collected in a range of an angle less than the round angle is used as target point cloud data, so as to segment point cloud data in the time dimension, thereby leading to a small time period of extraction of one-dimensional features of the point cloud data. Also, the one-dimensional features of the partial target point cloud data are used to update the complete LiDAR feature vector, so that a new LiDAR feature vector is generated in real time to determine information of a surrounding object, thereby realizing object detection. In this method, a part of the point cloud data is selected to be processed in real time, so as to avoid the problem of low overall processing efficiency due to the large delay of LiDAR data collection. Therefore, this method can reduce data delay, reduce the overall running time, and improve processing efficiency. By updating the whole LiDAR feature vector, the object information can be determined in real time in the whole range, so as to realize the object detection in the whole range.

On the basis of the above embodiment, in the above step 102, the determining of the LiDAR point feature of each of the data points in the target point cloud data includes steps B1 and B2.

In step B1, a three-dimensional position parameter x, y, z and a reflection intensity i of the data point are determined, and a position offset parameter dx, dy, dz indicating an offset between the data point and a central point of a preset projection plane is determined.

In step B2, the one-dimensional LiDAR point feature of the data point is determined based on the three-dimensional position parameter, the reflection intensity and the position offset parameter.

In the embodiment of the present disclosure, a projection plane is preset. The projection plane is a plane for displaying data points in the point cloud data, where each data point is projected to the plane to have a location on the plane. When collecting point cloud data, the LiDAR device can determine the three-dimensional position parameter x, y, z (i.e., the three-dimensional coordinates of the data point) and the reflection intensity i of each piece of point cloud data. Also, based on the three-dimensional position parameter and the location of the central point of the projection plane, an offset between them can be determined, that is, the position offset parameter dx, dy, dz can be determined. Based on the three-dimensional position parameter, the reflection intensity and the position offset parameter, the one-dimensional LiDAR point feature of the data point can be extracted.

In the embodiment of the present disclosure, a multi-layer perceptron (MLP) for extracting one-dimensional features can be pre-trained. The feature of each data point is extracted by the multi-layer perceptron. That is, the three-dimensional position parameter, the reflection intensity and the position offset parameter are used as the input of the multi-layer perceptron, to output the corresponding one-dimensional feature of the data point, that is, the one-dimensional LiDAR point feature.

On the basis of the above embodiment, in the above step 102, the updating of the previous frame of LiDAR feature vector based on the one-dimensional LiDAR point feature of each of the data points in the target point cloud data to generate a current frame of LiDAR feature vector includes steps C1 to C3.

In step C1, the previous frame of LiDAR feature vector of three-dimension is acquired, and in the previous frame of LiDAR feature vector, a one-dimensional feature vector corresponding to a position of the data point is determined according to a three-dimensional position parameter of the data point.

Figure 2:
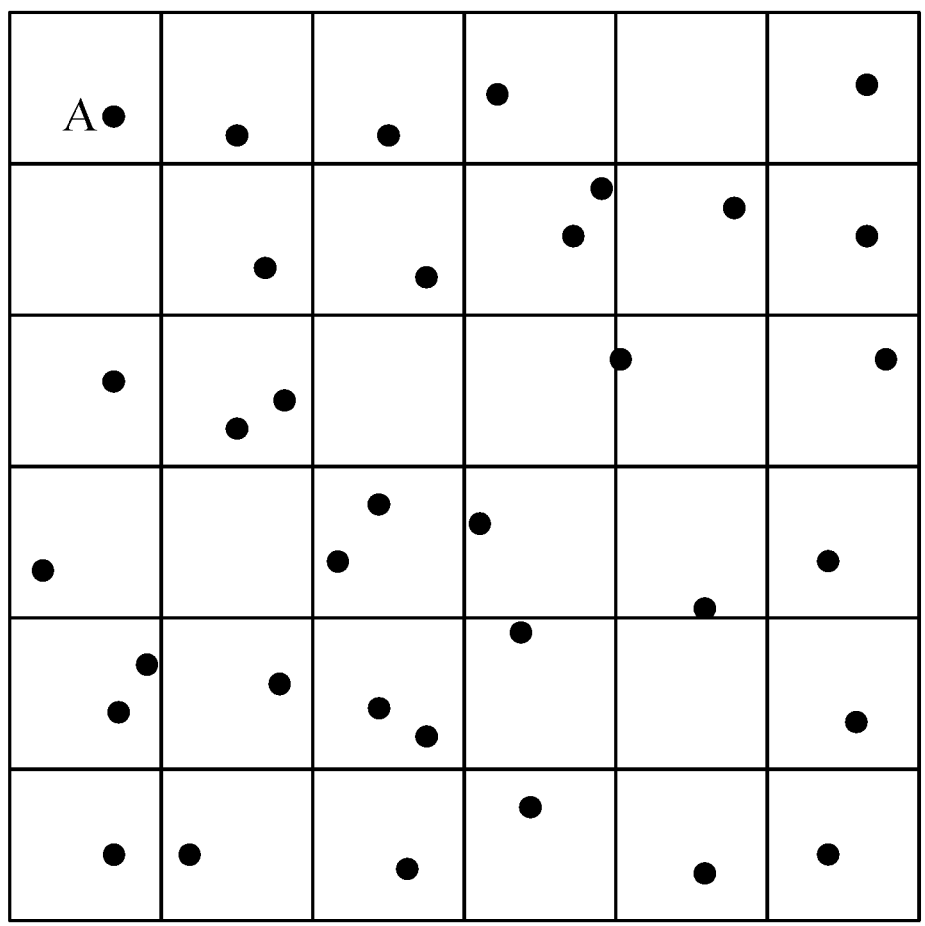
FIG. 2 is a schematic diagram of a projection plane in a method for real-time object detection according to an embodiment of the present disclosure.

In the embodiment of the present disclosure, a whole LiDAR feature vector can be generated based on a round of point cloud data. As shown in FIG. 2, which shows a schematic diagram of a projection plane, multiple data points are projected one the projection plane. The black dots in FIG. 2 represent data points. In this embodiment, the projection plane may be divided into multiple blocks. After the one-dimensional feature is determined for each block, the corresponding LiDAR feature vector can be formed by the one-dimensional features of all the blocks. For example, if the one-dimensional LiDAR point feature of a data point is a one-dimensional feature having a length f, and the projection plane is divided into X×Y (6×6 in FIG. 2) blocks, then the resulting LiDAR feature vector is a three-dimensional vector of X×Y×f. For each block, the one-dimensional feature of the block is determined based on the one-dimensional LiDAR point features of all data points in the block. If there is no data point in the block, the one-dimensional feature of the block may be determined as 0. If there is one data point in the block, the one-dimensional LiDAR point feature of the data point may be determined as the one-dimensional feature of the block. If there are multiple data points in the block, the one-dimensional LiDAR point feature of a selected data point may be determined as the one-dimensional feature of the block, or the weighted average of the one-dimensional LiDAR point features of the multiple data points in the block may be determined as the one-dimensional feature of the block.

In the embodiment of the present disclosure, the LiDAR feature vector is generated by real-time update, that is, the LiDAR feature vector can be generated by processing of each frame. Also, each data point corresponds to some features of the LiDAR feature vector. In the previous frame of the LiDAR feature vector, the one-dimensional feature vector corresponding to the position of the data point can be determined based on the three-dimensional position parameter of the data point. As shown in FIG. 2, if the LiDAR device generates the target point cloud data every 180°, the target point cloud data can occupies half of the projection plane. In this case, according to the position of the data point projected onto the projection plane, the block in the projection plane corresponding to each data point can be determined. Then the one-dimensional feature vector corresponding to the data point can be determined. For example, the one-dimensional feature vector may specifically be a one-dimensional vector of the block.

In step C2, a weighted averaging process is performed on the one-dimensional LiDAR point feature of the data point and the one-dimensional feature vector in the previous frame of LiDAR feature vector, to generate a one-dimensional feature vector in the current frame.

In step C3, the one-dimensional feature vector in the previous frame of LiDAR feature vector is updated as the one-dimensional feature vector in the current frame, to generate the current frame of LiDAR feature vector.

In the embodiment of the present disclosure, the one-dimensional feature vector in the previous frame is updated based on the one-dimensional LiDAR point feature of the data point to generate the corresponding one-dimensional feature vector of the current frame. The one-dimensional feature vector may be updated by the weighted average process. Then, the corresponding part in the previous frame of LiDAR feature vector is replaced with the one-dimensional feature vector of the current frame, to generate the current frame of LiDAR feature vector. For example, as shown in FIG. 2, data point A corresponds to the block in the upper left corner. Therefore, the weighted average process is performed on the one-dimensional feature vector of the block in the upper left corner in the previous frame of LiDAR feature vector and the one-dimensional LiDAR point feature of data point A, to generate the one-dimensional feature vector of the current frame for the block in the upper left corner. Then the feature vector of the block in the upper left corner is updated. Other one-dimensional feature vectors are updated in the similar manner, which are not repeated here.

The LiDAR feature vector (the current frame of LiDAR feature vector, the previous frame of LiDAR feature vector, etc.) may be a complete LiDAR feature vector, or may be a partial LiDAR feature vector which is a part of a complete LiDAR feature vector and contains the one-dimensional LiDAR point feature. That is, in the updating process, the complete LiDAR feature vector is updated, or only the relevant partial LiDAR feature vector is updated to further improve processing efficiency.

In the embodiment of the present disclosure, the one-dimensional feature vector in the LiDAR feature vector is updated based on the one-dimensional LiDAR point feature of the data point, thereby realizing real-time update of a part of the LiDAR feature vector. The update process is based on the one-dimensional feature vector of the previous frame, that is, the current frame of LiDAR feature vector is generated with reference to the previous frame of LiDAR feature vector, leading to more accurate object detection.

Optionally, object information may be extracted based on Convolutional Neural Networks (CNN). Specifically, the above step 103 of determining object information in real time according to the LiDAR feature vector of the current frame may include steps D1 and D2.

In step D1, a preset multi-layer convolutional neural network model is provided.

In step D2, the current frame of LiDAR feature vector is inputted into the preset multi-layer convolutional neural network model to generate object probability information and object shape information.

In the embodiment of the present disclosure, the trained multi-layer convolutional neural network model is preset. The current frame of LiDAR feature vector, after being determined, is used as the input of the multi-layer convolutional neural network model, to output an object probability diagram, an object shape information diagram, or the like. Based on the object probability diagram and object shape information diagram, corresponding object information can be extracted, such as a central point position, a length, a width, a direction and other parameters of the object. In this embodiment, by using the multi-layer convolutional neural network, a lot of global information in the LiDAR feature vector can be used.

In the embodiment of the present disclosure, the process of real-time object detection is divided into two parts, namely, point cloud data extraction and feature vector processing. The LiDAR device can collect the data of each data point in real time, and can extract the one-dimensional LiDAR point feature of each data point. Therefore, the current frame of LiDAR feature vector can be updated in real time, ensuring the real-time performance of the feature extraction process. The feature vector processing is a real-time processing of the LiDAR feature vector based on a convolutional neural network, a processing time length of which is the aforementioned data processing time length $T_2$.

In the method for real-time object detection provided according to the embodiment of the present disclosure, point cloud data collected in a range of an angle less than the round angle is used as target point cloud data, so as to segment point cloud data in the time dimension, thereby leading to a small time period of extraction of one-dimensional features of the point cloud data. Also, the one-dimensional features of the partial target point cloud data are used to update the complete LiDAR feature vector, so that a new LiDAR feature vector is generated in real time to determine information of a surrounding object, thereby realizing object detection. In this method, a part of the point cloud data is selected to be processed in real time, so as to avoid the problem of low overall processing efficiency due to the large delay of LiDAR data collection. Therefore, this method can reduce data delay, reduce the overall running time, and improve processing efficiency. By updating the whole LiDAR feature vector, the object information can be determined in real time in the whole range, so as to realize the object detection in the whole range. The one-dimensional feature vector in the LiDAR feature vector is updated based on the one-dimensional LiDAR point feature of the data point, thereby realizing real-time update of a part of the LiDAR feature vector. The update process is based on the one-dimensional feature vector of the previous frame, that is, the current frame of LiDAR feature vector is generated with reference to the previous frame of LiDAR feature vector, leading to more accurate object detection.

The method for real-time object detection provided according to the embodiments of the present disclosure is described in detail above with reference to FIG. 1 and FIG. 2. The method may be implemented by an apparatus. The following is a detailed description of the apparatus for real-time object detection provided according to an embodiment of the present disclosure.

Figure 3:
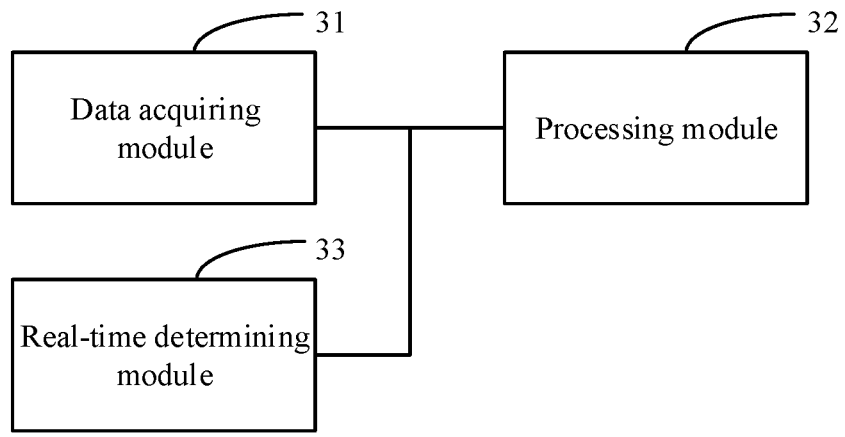
FIG. 3 is a schematic structural diagram of an apparatus for real-time object detection according to an embodiment of the present disclosure.

FIG. 3 is a schematic structural diagram of an apparatus for real-time object detection according to an embodiment of the present disclosure. As shown in FIG. 3, the apparatus for real-time object detection includes a data acquiring module 31, a processing module 32 and a real-time determining module 33.

The data acquiring module 31 is configured to acquire target point cloud data in a range of a preset angle, where the target point cloud data includes one or more data points, and the preset angle is less than the round angle.

The processing module 32 is configured to determine a one-dimensional LiDAR point feature of each of the data points in the target point cloud data, and update a previous frame of LiDAR feature vector based on the one-dimensional LiDAR point feature of each of the data points in the target point cloud data to generate a current frame of LiDAR feature vector.

The real-time determining module 33 is configured to determine object information in a real-time manner based on the current frame of LiDAR feature vector.

On the basis of the above embodiment, the data acquiring module 31 is configured to: determine a time length $T_1$ required for acquiring a round of point cloud data by a LiDAR device, and a time length $T_2$ required for processing the round of point cloud data; determine the preset angle $\alpha$ as $$\alpha = k \frac{T_2}{T_1} \times R,$$

where k denotes an adjusting coefficient, and R denotes the round angle; and generate the target point cloud data based on the one or more data points collected by the LiDAR device in the range of the preset angle.

On the basis of the above embodiment, that the processing module 32 is configured to determine a one-dimensional LiDAR point feature of each of the data points in the target point cloud data, includes that the processing module 32 is configured to: determine a three-dimensional position parameter and a reflection intensity of the data point; determine a position offset parameter indicating an offset between the data point and a central point of a preset projection plane; and determine the one-dimensional LiDAR point feature of the data point based on the three-dimensional position parameter, the reflection intensity and the position offset parameter.

On the basis of the above embodiment, that the processing module 32 is configured to update a previous frame of LiDAR feature vector based on the one-dimensional LiDAR point feature of each of the data points in the target point cloud data to generate a current frame of LiDAR feature vector, includes that the processing module 32 is configured to: acquire the previous frame of LiDAR feature vector; determine, in the previous frame of LiDAR feature vector, a one-dimensional feature vector corresponding to a position of the data point according to a three-dimensional position parameter of the data point; perform a weighted averaging process on the one-dimensional LiDAR point feature of the data point and the one-dimensional feature vector in the previous frame of LiDAR feature vector, to generate a one-dimensional feature vector in the current frame; and update the one-dimensional feature vector in the previous frame of LiDAR feature vector as the one-dimensional feature vector in the current frame, to generate the current frame of LiDAR feature vector.

On the basis of the above embodiment, that the real-time determining module is configured to determine object information in a real-time manner based on the current frame of LiDAR feature vector includes that the real-time determining module is configured to: provide a preset multi-layer convolutional neural network model; and input the current frame of LiDAR feature vector into the preset multi-layer convolutional neural network model to generate object probability information and object shape information.

On the basis of the above embodiments, the current frame of LiDAR feature vector may be a complete LiDAR feature vector, or may be a partial LiDAR feature vector which is a part of a complete LiDAR feature vector and contains the one-dimensional LiDAR point feature.

In the apparatus for real-time object detection provided according to the embodiment of the present disclosure, point cloud data collected in a range of an angle less than the round angle is used as target point cloud data, so as to segment point cloud data in the time dimension, thereby leading to a small time period of extraction of one-dimensional features of the point cloud data. Also, the one-dimensional features of the partial target point cloud data are used to update the complete LiDAR feature vector, so that a new LiDAR feature vector is generated in real time to determine information of a surrounding object, thereby realizing object detection. In this apparatus, a part of the point cloud data is selected to be processed in real time, so as to avoid the problem of low overall processing efficiency due to the large delay of LiDAR data collection. Therefore, this apparatus can reduce data delay, reduce the overall running time, and improve processing efficiency. By updating the whole LiDAR feature vector, the object information can be determined in real time in the whole range, so as to realize the object detection in the whole range. The one-dimensional feature vector in the LiDAR feature vector is updated based on the one-dimensional LiDAR point feature of the data point, thereby realizing real-time update of a part of the LiDAR feature vector. The update process is based on the one-dimensional feature vector of the previous frame, that is, the current frame of LiDAR feature vector is generated with reference to the previous frame of LiDAR feature vector, leading to more accurate object detection.

In addition, according to an embodiment of the present disclosure, an electronic device is also provided, including a bus, a transceiver, a memory, a processor, and a computer program stored in the memory and executable by the processor. The transceiver, the memory and the processor are connected to each other via the bus. The computer program is used to, when being executed by the processor, implement the above various embodiments of the method for real-time object detection. The electronic device can achieve the same technical effect, which will not be repeated here.

Figure 4:
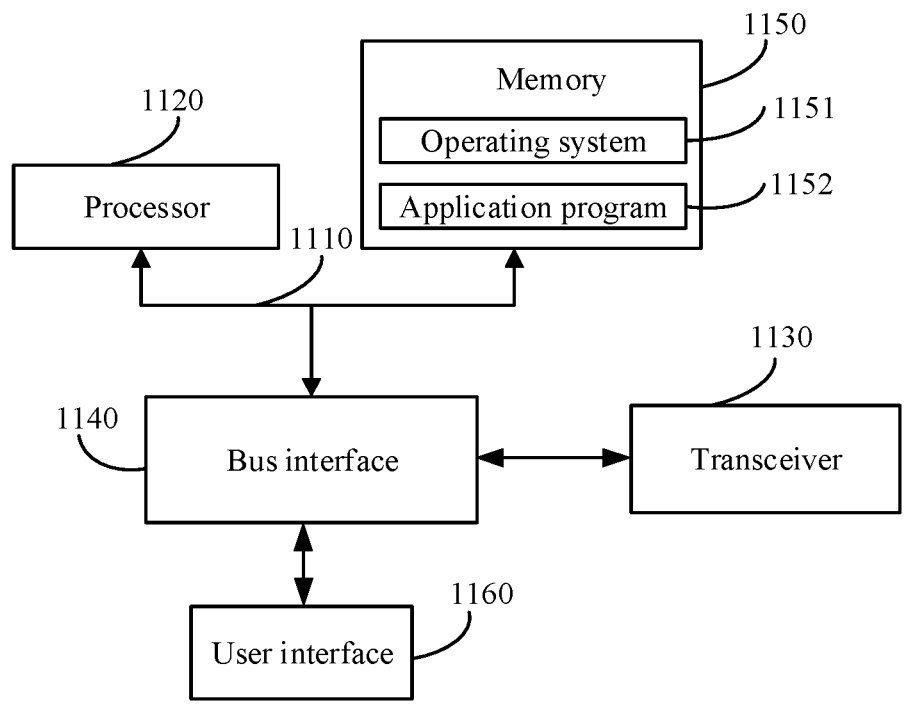
FIG. 4 is a schematic structural diagram of an electronic device for performing the method for real-time object detection according to an embodiment of the present disclosure.

Specifically, referring to FIG. 4, an electronic device is provided according to an embodiment of the present disclosure. The electronic device includes a bus 1110, a processor 1120, a transceiver 1130, a bus interface 1140, a memory 1150, and a user interface 1160.

In the embodiment of the present disclosure, the electronic device further includes a computer program stored in the memory 1150 and executable by the processor 1120. When the computer program is executed by the processor 1120, the processor performs steps of acquiring target point cloud data in a range of a preset angle, where the target point cloud data includes one or more data points, and the preset angle is less than the round angle; determining a one-dimensional LiDAR point feature of each of the data points in the target point cloud data; updating a previous frame of LiDAR feature vector based on the one-dimensional LiDAR point feature of each of the data points in the target point cloud data to generate a current frame of LiDAR feature vector; and determining object information in a real-time manner based on the current frame of LiDAR feature vector.

Optionally, when the computer program is executed by the processor 1120 to perform the step of acquiring target point cloud data in a range of a preset angle, the processor performs specifically the following steps of determining a time length $T_1$ required for acquiring a round of point cloud data by a LiDAR device, and a time length $T_2$ required for processing the round of point cloud data; determining the preset angle $\alpha$ as $$\alpha = k\frac{T_2}{T_1} \times R,$$

where k denotes an adjusting coefficient, and R denotes the round angle; and generating the target point cloud data based on the one or more data points collected by the LiDAR device in the range of the preset angle.

Optionally, when the computer program is executed by the processor 1120 to perform the step of determining a one-dimensional LiDAR point feature of each of the data points in the target point cloud data, the processor performs specifically the following steps of determining a three-dimensional position parameter and a reflection intensity of the data point; determining a position offset parameter indicating an offset between the data point and a central point of a preset projection plane; and determining the one-dimensional LiDAR point feature of the data point based on the three-dimensional position parameter, the reflection intensity and the position offset parameter.

Optionally, when the computer program is executed by the processor 1120 to perform the step of updating a previous frame of LiDAR feature vector based on the one-dimensional LiDAR point feature of each of the data points in the target point cloud data to generate a current frame of LiDAR feature vector, the processor performs specifically the following steps of acquiring the previous frame of LiDAR feature vector of three-dimension; determining, in the previous frame of LiDAR feature vector, a one-dimensional feature vector corresponding to a position of the data point according to a three-dimensional position parameter of the data point; performing a weighted averaging process on the one-dimensional LiDAR point feature of the data point and the one-dimensional feature vector in the previous frame of LiDAR feature vector, to generate a one-dimensional feature vector in the current frame; and updating the one-dimensional feature vector in the previous frame of LiDAR feature vector as the one-dimensional feature vector in the current frame, to generate the current frame of LiDAR feature vector.

Optionally, when the computer program is executed by the processor 1120 to perform the step of determining object information in a real-time manner based on the current frame of LiDAR feature vector, the processor performs specifically the following steps of providing a preset multi-layer convolutional neural network model; and inputting the current frame of LiDAR feature vector into the preset multi-layer convolutional neural network model to generate object probability information and object shape information.

The transceiver 1130 is configured to receive and send data under the control of the processor 1120.

In an embodiment of the present disclosure, a bus architecture (represented by bus 1110), i.e., the bus 1110, may include any number of interconnected buses and bridges. The bus 1110 connects various circuits of one or more processors represented by processor 1120 and memory represented by memory 1150.

The bus 1110 represents one or more of any one of several types of bus structures, including a memory bus and a memory controller, a peripheral bus, an Accelerate Graphical Port (AGP), a processor, or a local bus of any bus structure in various bus architectures. By way of example and not limitation, such architectures include: Industry Standard Architecture (ISA) bus, Micro Channel Architecture (MCA) bus, Extended ISA (Enhanced ISA, EISA) bus, Video Electronics Standard Association (VESA) bus, and Peripheral Component Interconnect (PCI) bus.

The processor 1120 may be an integrated circuit chip with signal processing capabilities. In the implementation process, the steps of the foregoing method embodiments may be implemented by an integrated logic circuit in the form of hardware in the processor or instructions in the form of software. The above processor includes: a general-purpose processor, a Central Processing Unit (CPU), a Network Processor (NP), a Digital Signal Processor (DSP), an Application Specific Integrated Circuit (ASIC), a Field Programmable Gate Array (FPGA), a Complex Programmable Logic Device (CPLD), a Programmable Logic Array (PLA), a Microcontroller Unit (MCU), or other programmable logic devices, discrete gates, transistor logic devices, discrete hardware components, which can implement or execute the methods, steps, and logical block diagrams disclosed in the embodiments of the present disclosure. For example, the processor may be a single-core processor or a multi-core processor, and the processor may be integrated into a single chip or located on multiple different chips.

The processor 1120 may be a microprocessor or any conventional processor. The method steps disclosed in conjunction with the embodiments of the present disclosure may be directly performed by a hardware decoding processor, or may be performed by a combination of hardware in the decoding processor and software modules. The software modules may be located in a Random Access Memory (RAM), a Flash Memory (Flash Memory), a Read-Only Memory (ROM), a Programmable Read Only Memory (Programmable ROM, PROM), an erasable and removable Programming read-only memory (Erasable PROM, EPROM), registers and other readable storage mediums known in the art. The readable storage medium is located in the memory, and the processor reads the information in the memory and implements the steps of the above method in combination with its hardware.

The bus 1110 may also connect various other circuits such as peripheral devices, voltage regulators, or power management circuits with each other. The bus interface 1140 provides an interface between the bus 1110 and the transceiver 1130, which are well known in the art. Therefore, it will not be further described in the embodiments of the present disclosure.

The transceiver 1130 may be one element or multiple elements, such as multiple receivers and transmitters, providing a unit for communicating with various other devices via a transmission medium. For example, the transceiver 1130 receives external data from other devices, and the transceiver 1130 is configured to send the data processed by the processor 1120 to other devices. Depending on the nature of the computer system, a user interface 1160 may also be provided, which includes, for example: a touch screen, a physical keyboard, a display, a mouse, a speaker, a microphone, a trackball, a joystick, and a stylus.

It should be understood that, in the embodiments of the present disclosure, the memory 1150 may further include memories set remotely with respect to the processor 1120, and these remotely set memories may be connected to the server through a network. One or more parts of the above network may be an ad hoc network, an intranet, an extranet, a Virtual Private Network (VPN), a Local Area Network (LAN), a Wireless Local Area Network (WLAN), a Wide Area Network (WAN), a Wireless Wide Area Network (WWAN), a Metropolitan Area Network (MAN), the Internet, a Public Switched Telephone Network (PSTN), a Plain Old Telephone Service Network (POTS), a Cellular Telephone Network, a wireless network, a Wireless Fidelity (Wi-Fi) network and a combination of two or more of the above networks. For example, the cellular telephone network and the wireless network may be a Global Mobile Communication (GSM) system, a Code Division Multiple Access (CDMA) system, a Global Microwave Interconnected Access (WiMAX) system, a General Packet Radio Service (GPRS) system, and a Wideband Code Division Multiple Address (WCDMA) system, a Long Term Evolution (LTE) system, an LTE Frequency Division Duplex (FDD) system, an LTE Time Division Duplex (TDD) system, an advanced long term evolution (LTE-A) system, an Universal Mobile Telecommunications (UMTS) system, an Enhanced Mobile Broadband (eMBB) system, a mass Machine Type of Communication (mMTC) system, an ultra Reliable Low Latency Communications (uRLLC) system, and the like.

It should be understood that the memory 1150 in the embodiments of the present disclosure may be a volatile memory or a non-volatile memory, or may include both a volatile memory and a non-volatile memory. The non-volatile memory includes: a Read-Only Memory (ROM), a Programmable Read-Only Memory (Programmable ROM, PROM), an Erasable Programmable Read-Only Memory (Erasable PROM, EPROM), an Electronically Erasable Programmable Read Only Memory (Electrically EPROM, EEPROM) or a Flash Memory (Flash Memory).

The volatile memory includes: a Random Access Memory (RAM), which is used as an external cache. By way of example but not limitation, many forms of RAM may be used, such as: a Static Random Access Memory (Static RAM, SRAM), a Dynamic Random Access Memory (Dynamic RAM, DRAM), a Synchronous Dynamic Random Access Memory (Synchronous DRAM, SDRAM), a Double Data Rate Synchronous Dynamic Random Access Memory (Double Data Rate SDRAM, DDRSDRAM), an Enhanced Synchronous Dynamic Random Access Memory (Enhanced SDRAM, ESDRAM), a Synchronous Linked Dynamic Random Access Memory (Synchlink DRAM, SLDRAM), and a direct memory bus random access memory (Direct Rambus RAM, DRRAM). The memory 1150 of the electronic device described in the embodiments of the present disclosure includes but is not limited to the above and any other suitable types of memories.

In the embodiments of the present disclosure, the memory 1150 stores the following elements of the operating system 1151 and the application program 1152: executable modules, data structures, a subset of the executable modules and the structures, or an extended set of the executable modules and the structures.

Specifically, the operating system 1151 includes various system programs, such as a framework layer, a core library layer, a driver layer, and the like, for implementing various basic services and processing hardware-based tasks. The application 1152 includes various applications, such as a Media Player and a Browser, which are used to implement various application services. The program for implementing the method of the embodiment of the present disclosure may be included in the application 1152. The application 1152 include: applets, objects, components, logic, data structures, and other computer system executable instructions that perform specific tasks or implement specific abstract data types.

In addition, according to an embodiment of the present disclosure, a computer-readable storage medium is provided, which stores a computer program. The computer program is used to, when being executed by a processor, implement the above various embodiments of the method for real-time object detection. The computer-readable storage medium can achieve the same technical effect, which will not be repeated here.

Specifically, the computer program, when being executed by a processor, can perform steps of acquiring target point cloud data in a range of a preset angle, where the target point cloud data includes one or more data points, and the preset angle is less than the round angle; determining a one-dimensional LiDAR point feature of each of the data points in the target point cloud data; updating a previous frame of LiDAR feature vector based on the one-dimensional LiDAR point feature of each of the data points in the target point cloud data to generate a current frame of LiDAR feature vector; and determining object information in a real-time manner based on the current frame of LiDAR feature vector.

Optionally, when the computer program is executed by the processor to perform the step of acquiring target point cloud data in a range of a preset angle, the processor performs specifically the following steps of determining a time length $T_1$ required for acquiring a round of point cloud data by a LiDAR device, and a time length $T_2$ required for processing the round of point cloud data; determining the preset angle α as $$\alpha = k \frac{T_2}{T_1} \times R,$$

where k denotes an adjusting coefficient, and R denotes the round angle; and generating the target point cloud data based on the one or more data points collected by the LiDAR device in the range of the preset angle.

Optionally, when the computer program is executed by the processor to perform the step of determining a one-dimensional LiDAR point feature of each of the data points in the target point cloud data, the processor performs specifically the following steps of determining a three-dimensional position parameter and a reflection intensity of the data point; determining a position offset parameter indicating an offset between the data point and a central point of a preset projection plane; and determining the one-dimensional LiDAR point feature of the data point based on the three-dimensional position parameter, the reflection intensity and the position offset parameter.

Optionally, when the computer program is executed by the processor 1120 to perform the step of updating a previous frame of LiDAR feature vector based on the one-dimensional LiDAR point feature of each of the data points in the target point cloud data to generate a current frame of LiDAR feature vector, the processor performs specifically the following steps of acquiring the previous frame of LiDAR feature vector of three-dimension; determining, in the previous frame of LiDAR feature vector, a one-dimensional feature vector corresponding to a position of the data point according to a three-dimensional position parameter of the data point; performing a weighted averaging process on the one-dimensional LiDAR point feature of the data point and the one-dimensional feature vector in the previous frame of LiDAR feature vector, to generate a one-dimensional feature vector in the current frame; and updating the one-dimensional feature vector in the previous frame of LiDAR feature vector as the one-dimensional feature vector in the current frame, to generate the current frame of LiDAR feature vector.

Optionally, when the computer program is executed by the processor to perform the step of determining object information in a real-time manner based on the current frame of LiDAR feature vector, the processor performs specifically the following steps of providing a preset multi-layer convolutional neural network model; and inputting the current frame of LiDAR feature vector into the preset multi-layer convolutional neural network model to generate object probability information and object shape information.

The computer-readable storage medium includes: permanent or non-permanent mediums, and removable or non-removable mediums, and is a tangible device that is capable of retaining and storing instructions for use by an instruction execution device. The computer-readable storage medium includes: an electronic storage device, a magnetic storage device, an optical storage device, an electromagnetic storage device, a semiconductor storage device, and any suitable combination thereof. The computer readable storage medium includes: a Phase Change Memory (PRAM), a Static Random Access Memory (SRAM), a Dynamic Random Access Memory (DRAM), other types of Random Access Memories (RAM), a Read Only Memory (ROM), a Non-Volatile Random Access Memory (NVRAM), an Electrically Erasable Programmable Read-Only Memory (EEPROM), a flash memory or another memory technology, a Compact Disc Read-Only Memory (CD-ROM), a Digital Versatile Disc (DVD) or another optical storage, a magnetic cassette storage, a magnetic tape storage or another magnetic storage device, a memory stick, a mechanical coding device (such as a punched card or raised structures in grooves on which instructions are recorded) or any other non-transmission medium that can be used to store information that may be accessed by computing devices. According to the definition in the embodiments of the present disclosure, the computer-readable storage medium does not include the transitory signal itself, such as radio waves or other freely propagating electromagnetic waves, electromagnetic waves propagating through waveguides or other transmission media (such as optical pulses passing through fiber optic cables), or electrical signals transmitted through wires.

In the embodiments according to the present disclosure, it should be understood that the disclosed apparatus, electronic device and method may be implemented in other ways. For example, the apparatus embodiments described above are only schematic. For example, the units or modules are divided based on a logic function thereof, and they may be divided in another way in practice. For example, multiple units or modules may be combined or integrated into another system, or some features may be omitted or not performed. In addition, a coupling, a direct coupling or communication connection between displayed or discussed constitutional components may be an indirect coupling or communication connection via some interfaces, devices or modules, and may be in an electrical form, a mechanical form or another form.

The units illustrated as separate components may be or may not be separated physically, and the component displayed as a unit may be or may not be a physical unit. That is, the components may be located at the same place, or may be distributed on multiple network units, and some of or all of the units can be selected, as required, to solve the problem solved by the solution according to the embodiments of the present disclosure.

In addition, each function unit according to each embodiment of the present disclosure may be integrated into one processing unit, or may be a separate unit physically, or two or more units are integrated into one unit. The integrated unit described above may be realized in a hardware form, or may be realized as a software function unit.

The integrated unit may be stored in a computer readable storage medium if the integrated unit is implemented as a software function unit and sold or used as a separate product. Base on such understanding, the essential part of the technical solution of the present disclosure or the part of the technical solution of the present disclosure contributed to the conventional technology or all of or a part of the technical solution may be embodied in a software product. The computer software product is stored in a storage medium, which includes several instructions to make a computer device (may be a personal computer, a server, a network device or the like) execute all or a part of steps of the method according to each embodiment of the present disclosure. The storage medium described above includes various mediums listed above which can store program codes.

Specific embodiments of the present disclosure are disclosed as described above, but the scope of protection of the present disclosure is not limited thereto. Changes and alteration which may be obtained in the technical scope of the present disclosure by a person skilled in the art should fall within the scope of protection of the present disclosure. Therefore, the scope of protection of the present disclosure should be defined by the appended claims.

What is claimed is:

1. A method for real-time object detection, comprising:
   acquiring target point cloud data using a Light Detection and Ranging (LiDAR) device in a range of a preset angle, wherein the target point cloud data comprises one or more data points, and the preset angle is less than 360 degrees the round angle;
   determining a one-dimensional LiDAR point feature of each of the data points in the target point cloud data;
   updating a previous frame of LiDAR feature vector based on the one-dimensional LiDAR point feature of each of the data points in the target point cloud data to generate a current frame of LiDAR feature vector; and
   determining object information in a real-time manner based on the current frame of LiDAR feature vector;
   wherein the acquiring target point cloud data in the range of the preset angle comprises:
   determining a time length T1 required for acquiring a round of point cloud data by the LiDAR device, and a time length T2 required for processing the round of point cloud data; determining the preset angle $\alpha_{as}$ $$\alpha = k \frac{T_2}{T_1} \times R$$

where k denotes an adjusting coefficient, and R denotes 360 degrees; and
generating the target point cloud data based on the one or more data points collected by the LiDAR device in the range of the preset angle.

2. The method according to claim 1, wherein the determining the one-dimensional LiDAR point feature of each of the data points in the target point cloud data comprises:
   determining a three-dimensional position parameter and a reflection intensity of the data point;
   determining a position offset parameter indicating an offset between the data point and a central point of a preset projection plane; and
   determining the one-dimensional LiDAR point feature of the data point based on the three-dimensional position parameter, the reflection intensity and the position offset parameter.

3. The method according to claim 1, wherein the updating the previous frame of LiDAR feature vector based on the one-dimensional LiDAR point feature of each of the data points in the target point cloud data to generate a current frame of LiDAR feature vector comprises:
   acquiring the previous frame of LiDAR feature vector of three-dimension;
   determining, in the previous frame of LiDAR feature vector, a one-dimensional feature vector corresponding to a position of the data point according to a three-dimensional position parameter of the data point;
   performing a weighted averaging process on the one-dimensional LiDAR point feature of the data point and the one-dimensional feature vector in the previous frame of LiDAR feature vector, to generate a one-dimensional feature vector in the current frame; and
   updating the one-dimensional feature vector in the previous frame of LiDAR feature vector as the one-dimensional feature vector in the current frame, to generate the current frame of LiDAR feature vector.

4. The method according to claim 1, wherein the determining object information in the real-time manner based on the current frame of LiDAR feature vector comprises:
   providing a preset multi-layer convolutional neural network model; and
   inputting the current frame of LiDAR feature vector into the preset multi-layer convolutional neural network model to generate object probability information and object shape information.

5. The method according to claim 1, wherein the current frame of LiDAR feature vector is:
   a complete LiDAR feature vector, or
   a partial LiDAR feature vector which is a part of a complete LiDAR feature vector and contains the one-dimensional LiDAR point feature.

6. An apparatus for real-time object detection, comprising:
   a data acquiring module, configured to acquire target point cloud data in a range of a preset angle, wherein the target point cloud data comprises one or more data points, and the preset angle is less than 360 degrees, the data acquiring module comprising a LiDAR device;
   a processing module, configured to determine a one-dimensional LiDAR point feature of each of the data points in the target point cloud data, and update a previous frame of LiDAR feature vector based on the one-dimensional LiDAR point feature of each of the data points in the target point cloud data to generate a current frame of LiDAR feature vector; and a real-time determining module, configured to determine object information in a real-time manner based on the current frame of LiDAR feature vector;

wherein the data acquiring module is configured to:

determine a time length T1 required for acquiring a round of point cloud data by the LiDAR device, and a time length T2 required for processing the round of point cloud data;

determine the preset angle $\alpha_{as}$ $$\alpha = k\frac{T_2}{T_1} \times R$$

where k denotes an adjusting coefficient, and R denotes 360 degrees; and generate the target point cloud data based on the one or more data points collected by the LiDAR device in the range of the preset angle.

7. The apparatus according to claim 6, wherein the processing module is configured to:

acquire the previous frame of LiDAR feature vector of three-dimension;

determine, in the previous frame of LiDAR feature vector, a one-dimensional feature vector corresponding to a position of the data point according to a three-dimensional position parameter of the data point;

perform a weighted averaging process on the one-dimensional LiDAR point feature of the data point and the one-dimensional feature vector in the previous frame of LiDAR feature vector, to generate a one-dimensional feature vector in the current frame; and update the one-dimensional feature vector in the previous frame of LiDAR feature vector as the one-dimensional feature vector in the current frame, to generate the current frame of LiDAR feature vector.

8. A non-transitory computer-readable storage medium, storing a computer program, wherein the computer program is used to, when being executed by a processor, perform:

acquiring target point cloud data using a Light Detection and Ranging (LiDAR) device in a range of a preset angle, wherein the target point cloud data comprises one or more data points, and the preset angle is less than 360 degrees;

determining a one-dimensional LiDAR point feature of each of the data points in the target point cloud data;

updating a previous frame of LiDAR feature vector based on the one-dimensional LiDAR point feature of each of the data points in the target point cloud data to generate a current frame of LiDAR feature vector; and determining object information in a real-time manner based on the current frame of LiDAR feature vector;

wherein the acquiring target point cloud data in the range of the preset angle comprises:

determining a time length T1 required for acquiring a round of point cloud data by the LiDAR device, and a time length T2 required for processing the round of point cloud data;

determining the preset angle $\alpha_{as}$ $$\alpha = k\frac{T_2}{T_1} \times R$$

where k denotes an adjusting coefficient, and R denotes 360 degrees; and generating the target point cloud data based on the one or more data points collected by the LiDAR device in the range of the preset angle.

* * * * *